United States Patent
Lin et al.

(10) Patent No.: US 11,691,484 B2
(45) Date of Patent: Jul. 4, 2023

(54) SUNSHADE CURTAIN HAVING A TRANSLOCATION FUNCTION

(71) Applicant: MACAUTO INDUSTRIAL CO., LTD., Tainan (TW)

(72) Inventors: Paul Lin, Tainan (TW); Hung-Ming Yen, Tainan (TW)

(73) Assignee: MACAUTO INDUSTRIAL CO., LTD., Tainan (TW)

( * ) Notice: Subject to any disclaimer, the term of this patent is extended or adjusted under 35 U.S.C. 154(b) by 32 days.

(21) Appl. No.: 17/585,656

(22) Filed: Jan. 27, 2022

(65) Prior Publication Data

US 2022/0250449 A1    Aug. 11, 2022

(30) Foreign Application Priority Data

Feb. 5, 2021 (TW) .................................. 110104556

(51) Int. Cl.
*B60J 1/20* (2006.01)
*B60J 3/02* (2006.01)

(52) U.S. Cl.
CPC ............ *B60J 1/2091* (2013.01); *B60J 1/205* (2013.01); *B60J 1/2063* (2013.01); *B60J 1/2083* (2013.01); *B60J 3/02* (2013.01)

(58) Field of Classification Search
CPC ...... B60J 1/2091; B60J 1/2063; B60J 1/2083; B60J 1/205; B60J 1/2055; B60J 1/2072; B60J 3/02
USPC .......... 296/97.9, 97.8, 142, 97.4; 160/DIG. 3
See application file for complete search history.

(56) References Cited

U.S. PATENT DOCUMENTS

| | | | | |
|---|---|---|---|---|
| 5,445,428 A | * | 8/1995 | Yung-Sung | B60J 1/2011 296/97.7 |
| 2004/0012225 A1 | * | 1/2004 | Schlecht | B60J 1/2063 296/143 |
| 2010/0194141 A1 | * | 8/2010 | Varney | B60J 1/2069 296/152 |
| 2020/0108698 A1 | * | 4/2020 | Sakurai | B60R 11/0235 |

FOREIGN PATENT DOCUMENTS

| | | | | |
|---|---|---|---|---|
| CN | 2457319 Y | * | 10/2001 | |
| CN | 108944363 A | * | 12/2018 | |
| EP | 1700726 A2 | * | 9/2006 | ............ B60J 1/2038 |

* cited by examiner

*Primary Examiner* — Jason S Morrow
*Assistant Examiner* — Wenwei Zhou
(74) *Attorney, Agent, or Firm* — Bacon & Thomas, PLLC

(57) ABSTRACT

A sunshade curtain having a translocation function has a curtain mechanism and a translocation mechanism. The curtain mechanism has a retracting shaft tube and a curtain mounted in the retracting shaft tube. The retracting shaft tube is capable of being rotated frontward and rearward. The curtain is capable of being pulled to extend out for shading the rear-side window. The translocation mechanism is mounted between the retracting shaft tube and a vehicle side wall in a vehicle. When the curtain mechanism is folded, the translocation mechanism makes the retracting shaft tube located adjacent to a side edge of a forward side pillar of the vehicle. When the curtain mechanism is unfolded, the retracting shaft tube is capable of being operated to be deflected toward a back of a forward side pillar to a normal position in a vertical state.

20 Claims, 15 Drawing Sheets

SUNSHADE CURTAIN HAVING A TRANSLOCATION FUNCTION

BACKGROUND OF THE INVENTION

1. Field of the Invention

The present invention relates to a sunshade curtain, and more particularly to a sunshade curtain that is mounted on a vehicle side wall in a vehicle for shading a side window on the vehicle side wall.

2. Description of Related Art

For shading a side window on a vehicle side wall in a vehicle, a conventional sunshade curtain is mounted on an inner surface of a door glass mounted on the side window. The conventional sunshade curtain has two types: manual and electric, and each of them has its advantages. Generally speaking, the conventional sunshade curtain has a curtain mechanism. The curtain mechanism has a retracting shaft tube and a curtain connected to the retracting shaft tube. The curtain can be drawn out from the retracting shaft tube to expand and can be retracted into the retracting shaft tube. Besides, the electric sunshade curtain further has an electric driving mechanism. The electric driving mechanism is connected to an operating side plate of the curtain of the curtain mechanism to electrically expand and retract the curtain.

The manual sunshade curtain and the electric sunshade curtain are applied to be located on the side window of the vehicle for shading. However, a three-row sport utility vehicle has a relatively long body. For safety concerns, the three-row sport utility vehicle has a forward side pillar (commonly referred to as a C pillar) located between a rear-side window and a middle-side window. The conventional sunshade curtain is applied to the rear-side window (between the C pillar and a D pillar). The retracting shaft tube and the forward side pillar are side by side. After the curtain is expanded, a bottom edge of the curtain is upwardly skewed relative to a bottom edge of the rear-side window. Light outside the three-row sport utility vehicle passes through an unshielded part between the bottom edge of the curtain and the bottom edge of the rear-side window. A shading rate of the conventional sunshade curtain is decreased, failing to achieve the intended shading effect.

For reaching an intended shading rate, the bottom edge of the curtain must be flush with the bottom edge of the rear-side window. Thus, the retracting shaft tube of the curtain mechanism of the conventional sunshade curtain is mounted vertically. Although the retracting shaft tube is mounted near a rear side of the forward side pillar, a top section of the retracting shaft tube is still skewed behind the forward side pillar. The retracting shaft tube cannot be adjacent to the forward side pillar abreast. It is difficult to integrate the curtain mechanism of the conventional sunshade curtain with structure and equipment of the vehicle, decreasing its aesthetic appeal.

To overcome the shortcomings, the present invention provides a sunshade curtain having a translocation function to mitigate or obviate the aforementioned problems.

SUMMARY OF THE INVENTION

The objective of the invention is to provide a sunshade curtain having a translocation function that can solve the problem that the curtain mechanism of the conventional sunshade curtain cannot be adjacent to the forward side pillar of the vehicle side wall in a folded state.

The sunshade curtain having a translocation function is applied to be mounted on a vehicle side wall in a vehicle for shading an inner side of a rear-side window located behind a forward side pillar of the vehicle side wall. The sunshade curtain has a curtain mechanism and a translocation mechanism.

The curtain mechanism has a retracting shaft tube and a curtain. The curtain is mounted in the retracting shaft tube and has an operating side plate extended out of the retracting shaft tube. The curtain is capable of being operated to extend out or roll up. The retracting shaft tube has a connecting portion and a rotating shaft. The connecting portion is mounted on a bottom end of the retracting shaft tube. The rotating shaft is mounted on the connecting portion. The retracting shaft tube is pivoted below the rear-side window adjacent to the forward side pillar via the rotating shaft, such that the retracting shaft tube is capable of being rotated frontward and rearward. The curtain is capable of being pulled to extend out for shading the rear-side window.

The translocation mechanism is mounted between the retracting shaft tube and the vehicle side wall. When the curtain mechanism is folded, the translocation mechanism makes the retracting shaft tube located at a folded position in a front-tilted state. The folded position is adjacent to a side edge of the forward side pillar. When the curtain mechanism is unfolded, the retracting shaft tube is capable of being operated to deflect toward a back of the forward side pillar to a normal position in a vertical state.

With the abovementioned structure of the sunshade curtain, the sunshade curtain is mounted on the vehicle side wall of the vehicle for shading the rear-side window. Furthermore, when the curtain mechanism is folded, by the translocation mechanism, the curtain mechanism is frontward deflected adjacent to a position, which is located at an inner surface of the forward side pillar located in front of the rear-side window, of the vehicle side wall. The translocated curtain mechanism is close to the forward side pillar for maintaining an integrity and aesthetics of an interior of the vehicle. When the curtain mechanism is unfolded, by the translocation mechanism, the curtain mechanism is rearward translocated from the front-tilted state to the vertical state, and then the curtain is extended out. A bottom edge of the extended curtain is close to a bottom edge of the rear-side window to flush shade the rear-side window for providing a greater shading rate for the rear-side windows and providing a best shading effect.

The sunshade curtain can further utilize the translocation function produced by the curtain mechanism combined with the translocation mechanism and the forward side pillar having a retracting space. When the curtain mechanism is translocated to the folded position, the curtain mechanism can be received into the retracting space of the forward side pillar. The curtain mechanism is protected by the forward side pillar. The curtain mechanism is translocated to the folded position and is hid in the forward side pillar.

The curtain mechanism of the sunshade curtain can be a manually operated mechanism. The translocation mechanism limits an angle range of a frontward deflection and a rearward deflection of the retracting shaft tube through a limiting portion. A limiting portion of the translocation mechanism provides a resilience to the retracting shaft tube of the curtain mechanism. When a user manually operates the curtain of the curtain mechanism to extend out or roll up, the curtain mechanism can automatically translocate according to a force exerted on the curtain. Operation of the curtain mechanism is convenient.

The sunshade curtain further has a rail and a driving mechanism. The rail is mounted below the rear-side window. The driving mechanism has a driving arm and an electric driving assembly. A bottom end of the driving arm is mounted on the rail. A top end of the driving arm is connected to an operating side plate of the curtain. The electric driving assembly is capable of being operated to drive the driving arm for driving the curtain to extend out or roll up. Therefore, the sunshade curtain can be controlled to electrically operate the curtain of the curtain mechanism to extend out or roll up. On the other hand, the curtain mechanism can automatically translocate according to a force exerted on the curtain mechanism through the translocation mechanism. Operation of the curtain mechanism is convenient.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
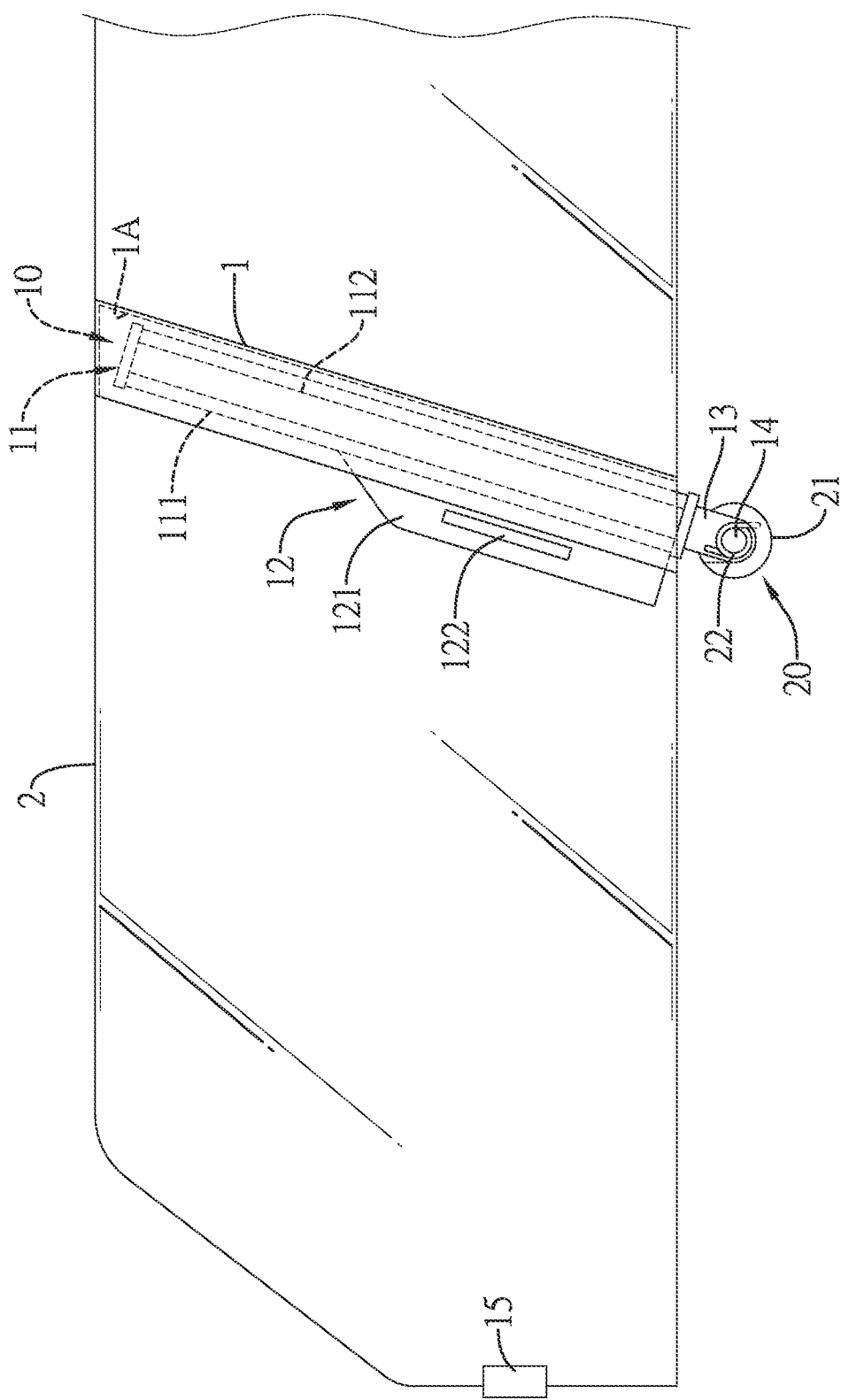
FIG. 1 is a side view of a first embodiment of a sunshade curtain having a translocation function in accordance with the present invention, showing the sunshade curtain is located in a folded position.

A sunshade curtain having a translocation function is applied to be mounted on a vehicle side wall in a vehicle. With reference to FIGS. 1, 4, 7, 10, and 13, the sunshade curtain is used to shade a rear-side window 2, which is located behind a forward side pillar 1, of the vehicle side wall. The sunshade curtain has a curtain mechanism 10 and a translocation mechanism 20. The curtain mechanism 10 has a retracting shaft tube 11 and a curtain 12. The curtain 12 is mounted in the retracting shaft tube 11 and is capable of being operated to extend out or roll up. The translocation mechanism 20 is mounted between the retracting shaft tube 11 and the vehicle side wall. A folded position of the curtain mechanism 10 in a folded state is close to the forward side pillar 1. The curtain mechanism 10 is capable of being operated to be translocated relative to the forward side pillar 1 to a normal position in a vertical state, and then the curtain 12 is extended to shade the rear-side window 2 for providing the rear-side window 2 with a greater shading rate.

Preferably, the forward side pillar 1 has a retracting space 1A formed in the forward side pillar 1. The forward side pillar 1 has two openings. The two openings are respectively formed on a rear side and a bottom end of the forward side pillar 1 and both communicate with the retracting space 1A. The curtain mechanism 1 passes in and out of the retracting space 1A of the forward side pillar 1 through the two openings of the forward side pillar 1. When the curtain mechanism 10 is translocated to the folded position, the curtain mechanism 10 can be received into the retracting space 1A of the forward side pillar 1. The curtain mechanism 10 is protected by the forward side pillar 1. The curtain mechanism 10 is translocated to the folded position and is hid in the forward side pillar 1.

Based on the above-mentioned inventive concept, the sunshade curtain can be achieved by multiple embodiments as shown in FIGS. 1, 4, 7, 10, and 13. The sunshade curtain can be a manually operated sunshade curtain or an electrically operated sunshade curtain, and each of the embodiments is described as follows.

Figure 2:
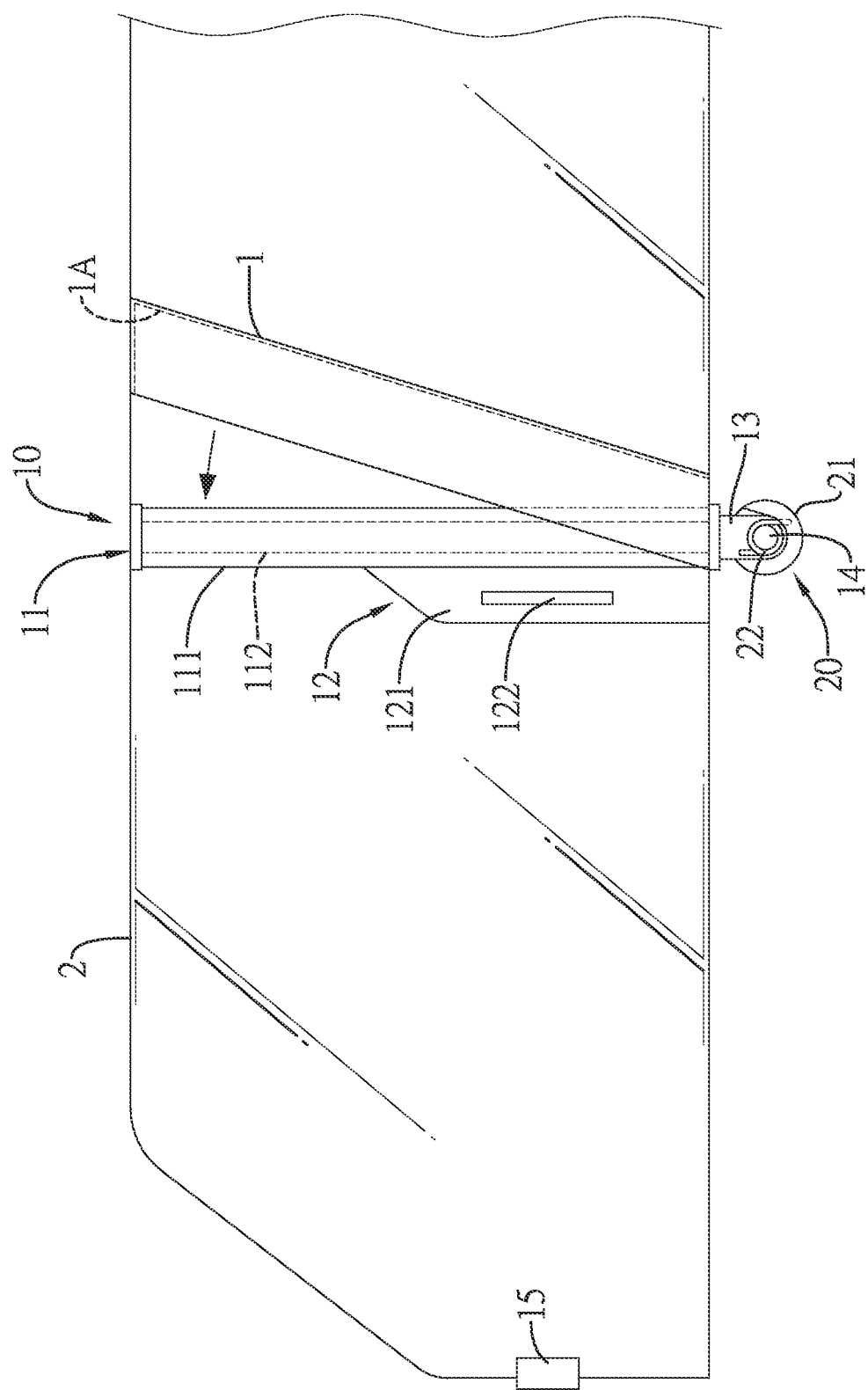
FIG. 2 is a side view of the sunshade curtain in FIG. 1, showing the sunshade curtain is located in a normal position.
Figure 3:
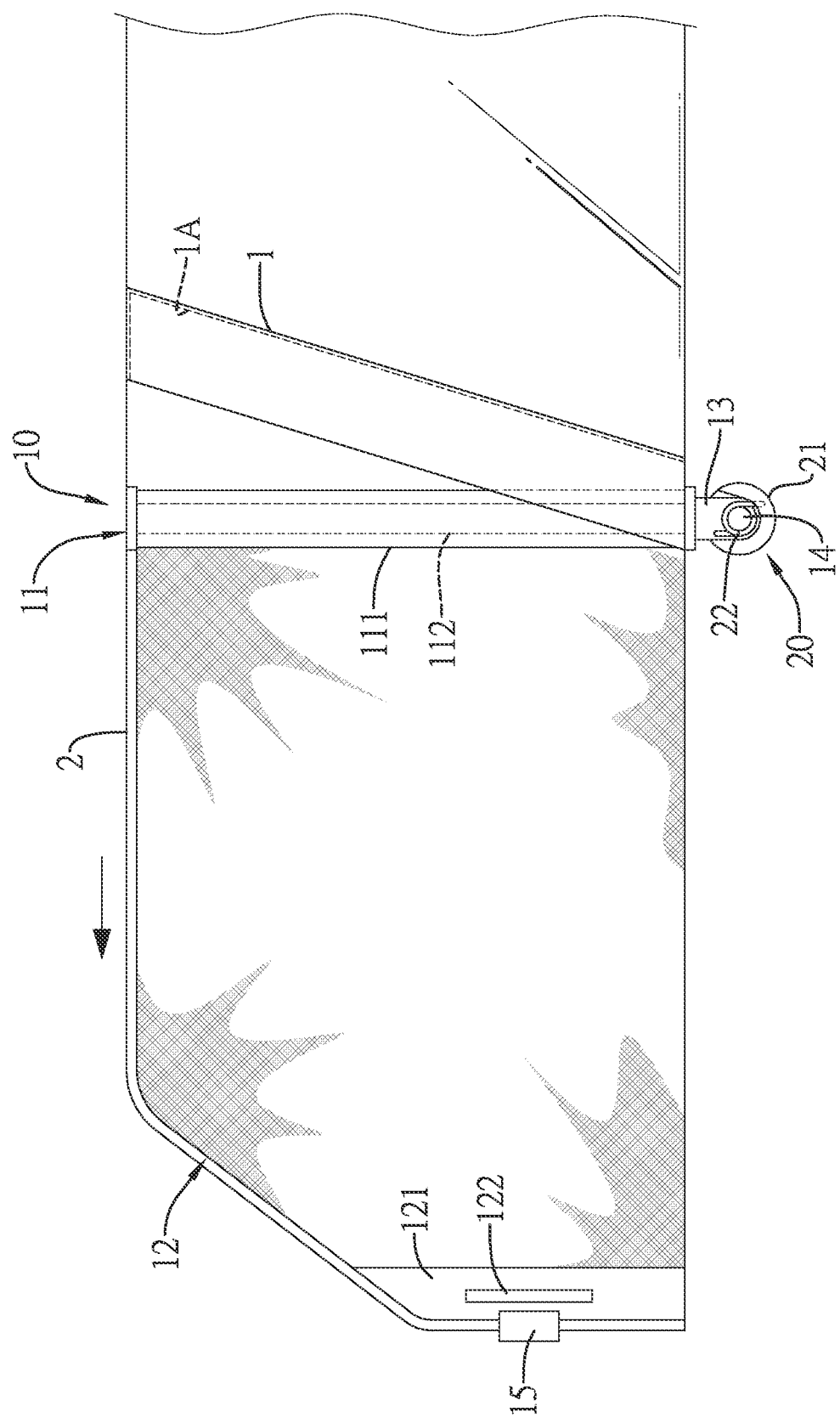
FIG. 3 is a side view of the sunshade curtain in FIG. 1, showing a curtain is in an extended state.

With reference to FIGS. 1 to 3, in a first embodiment, the sunshade curtain is the manually operated sunshade curtain. The sunshade curtain has the curtain mechanism 10 and the translocation mechanism 20. The curtain mechanism 10 has the retracting shaft tube 11 and a curtain 12. The retracting shaft tube 11 has a connecting portion 13 and a rotating shaft 14. The connecting portion 13 is mounted on a bottom end of the retracting shaft tube 11. The rotating shaft 14 is mounted on the connecting portion 13. The rotating shaft 14 can be an independent element, or the rotating shaft 14 is integrally formed on the connecting portion 13. The retracting shaft tube 11 is pivoted below the rear-side window 2 of the vehicle side wall adjacent to the forward side pillar 1 via the rotating shaft 14. The retracting shaft tube 11 is capable of rotating frontward and rearward.

In the curtain mechanism 10, the retracting shaft tube 11 has a body 111 and a curtain retractor 112 mounted in the body 111. The body 111 has an elongated hole formed on a rear side of the body 111 and extended along an axis of the body 111. The curtain retractor 112 can be conventional, and its structure will not be described in detail. The connecting portion 13 is mounted on a bottom end of the body 111. The curtain 12 has a connecting edge and an operating side plate 121 opposite to the connecting edge. The connecting edge of the curtain 12 passes through the elongated hole of the body 111, is inserted into the body 111 of the retracting shaft tube 11, and is connected to the curtain retractor 112. The curtain 12 can be rolled up automatically by the curtain retractor 112 of the retracting shaft tube 11. The operating side plate 121 of the curtain 12 is located out of the body 111 of the retracting shaft tube 11 and can be pulled and extended out of the retracting shaft tube 11. When the curtain 12 is in a fully unfolded state, the operating side plate 121 can be fixed at a rear side of the rear-side window 2.

When the retracting space 1A is preformed in the forward side pillar 1, a bottom section of the retracting shaft tube 11 passes through the retracting space 1A of the forward side pillar, extends out of the bottom end of the forward side pillar 1, and is pivoted on the vehicle side wall below the forward side pillar 1 through the connecting portion 13 mounted on the bottom end of the body 111. The curtain mechanism 10 passes in and out of the retracting space 1A of the forward side pillar 1 through the two openings of the forward side pillar 1. When the curtain mechanism 10 is translocated to the folded position, the curtain mechanism 10 can be received into the retracting space 1A of the forward side pillar 1. The curtain mechanism 10 is translocated to the folded position and is hid in the forward side pillar 1.

With reference to FIGS. 1 to 3, the curtain mechanism 10 can be manually operated to extend out or roll up. The curtain 12 has a handle 122 mounted on the operating side plate 121. The handle 122 provides a user with a hand-held operation. The curtain mechanism 10 has a hanging member 15. The hanging member 15 is mounted at the rear side of the rear-side window. The extended curtain 12 is connected to the hanging member 15 through the operating side plate 121 for maintaining the curtain 12 in an extended state. The operating side plate 121 can be detached from the hanging member 15, and then the curtain 12 can be automatically rolled to the folded state by the retracting shaft tube 11.

With reference to FIGS. 1 to 3, in the first embodiment, the translocation mechanism 20 is connected between the curtain mechanism 10 and the vehicle side wall. The translocation mechanism 20 is mounted on the bottom end of the retracting shaft tube 11 of the curtain mechanism 10 and is located below the rear-side window 2 of the vehicle side wall adjacent to the forward side pillar 1. The translocation mechanism 20 has a limiting portion 21 and an elastic member 22. The limiting portion 21 is mounted on the vehicle side wall and is located at a side edge of the connecting portion 13 for limiting an angle range of a frontward deflection and a rearward deflection of the retracting shaft tube 11. The elastic member 22 provides a resilience to the retracting shaft tube 11 of the curtain mechanism 10. The retracting shaft tube 11 is rearward deflected from a side edge of the forward side pillar 1 to the normal position in the vertical state through a force of pulling the curtain 12 to extend backward. When the curtain 12 is rolled by the retracting shaft tube 11, with the resilience provided by the elastic member 22, the retracting shaft tube 11 is frontward deflected and restored to the folded position adjacent to the forward side pillar 1. Further, the curtain mechanism 10 is received into the retracting space 1A of the forward side pillar 1.

With reference to FIGS. 1 to 3, in the first embodiment, the elastic member 22 is a torsion spring or a compression spring, and is mounted between the connecting portion 13 and the limiting portion 21. The elastic member 22 provides the connecting portion 13 of the retracting shaft tube 11 with a frontward resilience. Alternatively, the elastic member 22 is an extension spring or an elastic strip, and is connected between a top section of the retracting shaft tube 11 and the vehicle side wall.

With reference to FIGS. 4, 7, 10, and 13, in multiple embodiments, the sunshade curtain is the electrically operated sunshade curtain. The sunshade curtain not only has the curtain mechanism 10 and the translocation mechanism 20, but also has a rail and a driving mechanism 40. The sunshade curtain can electrically operate the curtain of the curtain mechanism to extend out or roll up.

With reference to FIGS. 4, 7, 10, and 13, the curtain mechanism 10 has the retracting shaft tube 11 and the curtain 12. Structure of the curtain mechanism 10 is as described above and will not be described again. With reference to FIGS. 4 to 15, the translocation mechanism 20 is mounted between the retracting shaft tube 11 and the vehicle side wall. The curtain mechanism 10 is close to the forward side pillar 1 in the folded state. Further, the curtain mechanism 10 can be received into the retracting space 1A of the forward side pillar 1. The curtain mechanism 10 is capable of being operated to be translocated relative to the forward side pillar 1 to the normal position in the vertical state for extending the curtain 12 to shade the rear-side window 2. The structure of the translocation mechanism 20 may be modified in accordance with a combination of the driving mechanism 40 and the curtain mechanism 10, described as follows.

With reference to FIGS. 4, 7, 10, and 13, the rail 30 is applied to be mounted on the vehicle side wall, is located below the rear-side window 2, and has a rail groove with an opening facing upward. The rail 30 can be mounted in a top portion of the vehicle side wall, and only the opening formed on the rail is exposed out of a top surface of the vehicle side wall. Alternatively, the rail 30 is mounted on the top surface of the vehicle side wall and is exposed out of the top portion of the vehicle side wall.

With reference to FIGS. 4 to 15, the driving mechanism 40 has a driving arm 41 and an electric driving assembly 42. A bottom end of the driving arm 41 is mounted on the rail 30 and is moveable along the rail 30. A top end of the driving arm 41 is connected to the operating side plate 121 of the curtain 12. The electric driving assembly 42 is mounted in the vehicle side wall, is connected to the driving arm 41, and is electrically connected to a control system or a control switch of the vehicle. Further, the electric driving assembly 42 can cooperate with a touch switch or a position sensing element in the vehicle side wall to detect and control (not shown in figures). The electric driving assembly 42 can be controlled for automatically driving the driving arm 41 to move along the rail 30. The curtain 12 of the curtain mechanism 10 is driven by the driving arm 41 to extend out or roll up.

With reference to FIGS. 4 to 15, the electric driving assembly 42 has a motor gear box assembly 421 and a driving strip 422 being flexible. The motor gear box assembly 421 is electrically connected to the control system of the vehicle. The driving strip 422 is connected to the motor gear box assembly 421 and is inserted into the rail 30 for connecting the bottom end of the driving arm 41. The motor gear box assembly 421 is controlled to drive the driving strip 422 to drive the driving arm 41 to move along the rail 30. The motor gear box assembly 421 can use existing products, and its structure will not be described. In addition, the electric driving assembly 42 can be replaced with other equivalent driving assemblies. Amount of the driving strips 422 can be increased according to actual requirements.

With reference to FIGS. 4 to 9, in a second embodiment and a third embodiment, an end of the driving strip 422 driven by the motor gear box assembly 421 is inserted into a front end 31 of the rail 30 and is connected to the bottom end of the driving arm 41. With reference to FIGS. 10 to 15, in the multiple embodiments, the driving strip 422 driven by the motor gear box assembly 421 is inserted into a rear end 32 of the rail 30 and is connected to the bottom end of the driving arm 41. The motor gear box assembly 421 can drive the driving strip 422 to backward push the driving arm 42 for pulling the curtain 12 of the curtain mechanism 10 to extend out. The curtain 12 generates a backward pulling force exerted on the retracting shaft tube 11 of the curtain mechanism 10. The retracting shaft tube 11 is backward deflected automatically. The motor gear box assembly 421 can drive the driving arm 41 by the driving strip 422 to pull the curtain 12 of the curtain mechanism 10 to roll up.

Figure 4:
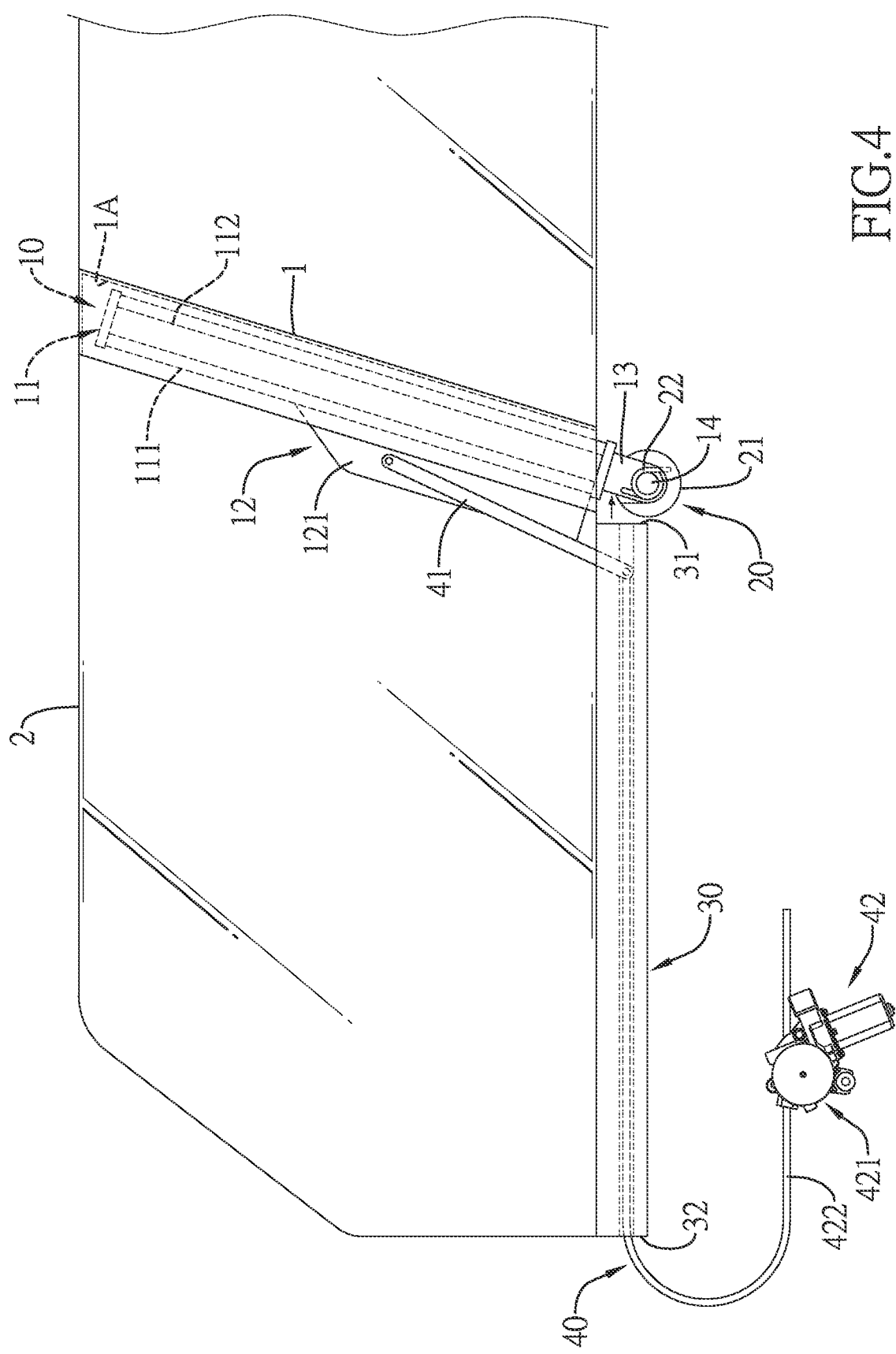
FIG. 4 is a side view of a second embodiment of a sunshade curtain in accordance with the present invention, showing the sunshade curtain is located in a folded position.
Figure 5:
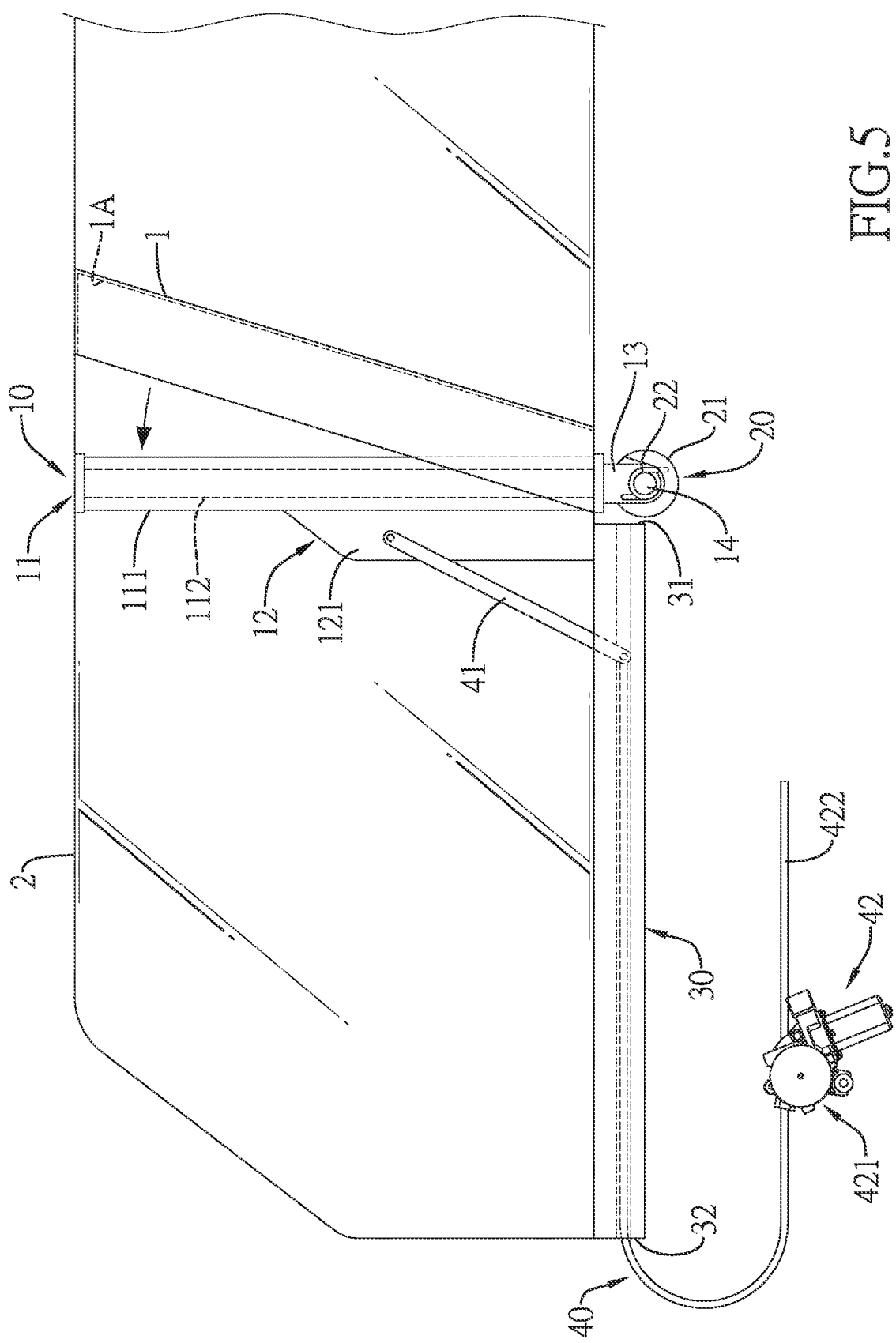
FIG. 5 is a side view of the sunshade curtain in FIG. 4, showing the sunshade curtain is located in a normal position.
Figure 6:
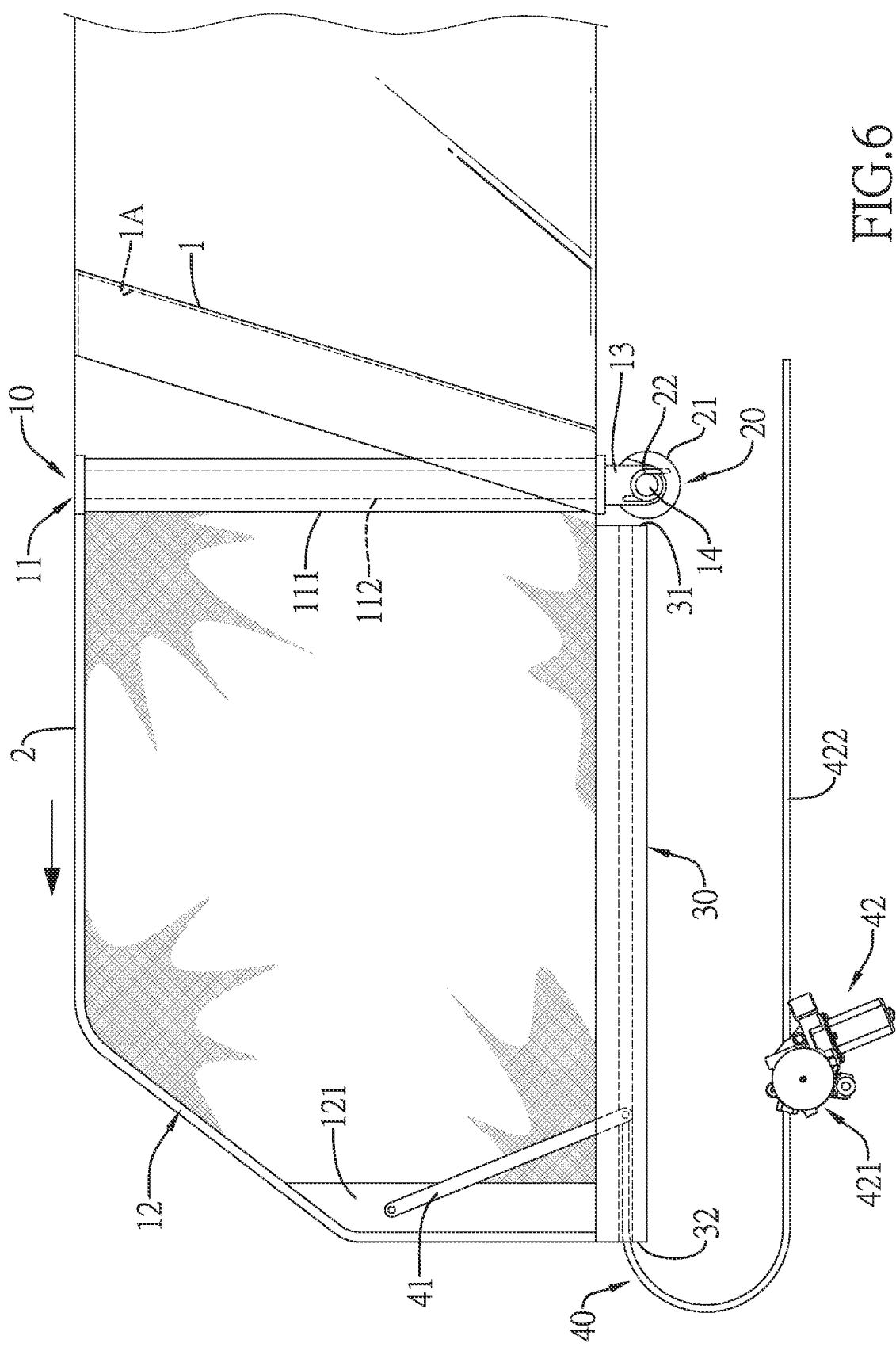
FIG. 6 is a side view of the sunshade curtain in FIG. 4, showing a curtain is in an extended state.

The structure of the translocation mechanism 20 is modified in accordance with the combination of the driving mechanism 40 and the curtain mechanism 10. With reference to FIGS. 4 to 6, the end of the driving strip 422 driven by the motor gear box assembly 421 is inserted into the front end 31 or the rear end 32 of the rail 30 and is connected to the bottom end of the driving arm 41. The translocation mechanism 20 has a limiting portion 21 and an elastic member 22. The limiting portion 21 is mounted on the vehicle side wall and is located at the side edge of the connecting portion 13 for limiting the angle range of the frontward deflection and the rearward deflection of the retracting shaft tube 11. The elastic member 22 provides the resilience to the retracting shaft tube 11 of the curtain mechanism 10. The retracting shaft tube 11 is rearward deflected from the side edge of the forward side pillar 1 to the normal position in the vertical state through the force driving the curtain 12 to extend backward though the driving arm 41 driven by the electric driving assembly 42. When the curtain 12 is rolled by the retracting shaft tube 11, with the resilience provided by the elastic member 22, the retracting shaft tube 11 is frontward deflected and restored to the folded position adjacent to the forward side pillar 1. Further, the curtain mechanism 10 is received into the retracting space 1A of the forward side pillar 1. The curtain mechanism 10 is hid in the forward side pillar 1.

The end of the driving strip 422 is inserted into the rear end 32 of the rail 30 and is connected to the bottom end of the driving arm 41. When the curtain 12 is rolled by the retracting shaft tube 11, with the resilience provided by the elastic member 22, the driving arm 41 driven by the driving strip 422 provides the retracting shaft tube 11 with a frontward force through the operating side plate 121. The retracting shaft tube 11 is frontward deflected and restored to the folded position adjacent to the forward side pillar 1. Further, the curtain mechanism 10 is received into the retracting space 1A of the forward side pillar 1.

The elastic member 22 is the torsion spring or the compression spring and is mounted between the connecting portion 13 and the limiting portion 21. The elastic member 22 provides the connecting portion 13 of the retracting shaft tube 11 with the frontward resilience. Alternatively, the elastic member 22 is an extension spring or an elastic strip, and is connected between a top section of the retracting shaft tube 11 and the vehicle side wall.

Figure 7:
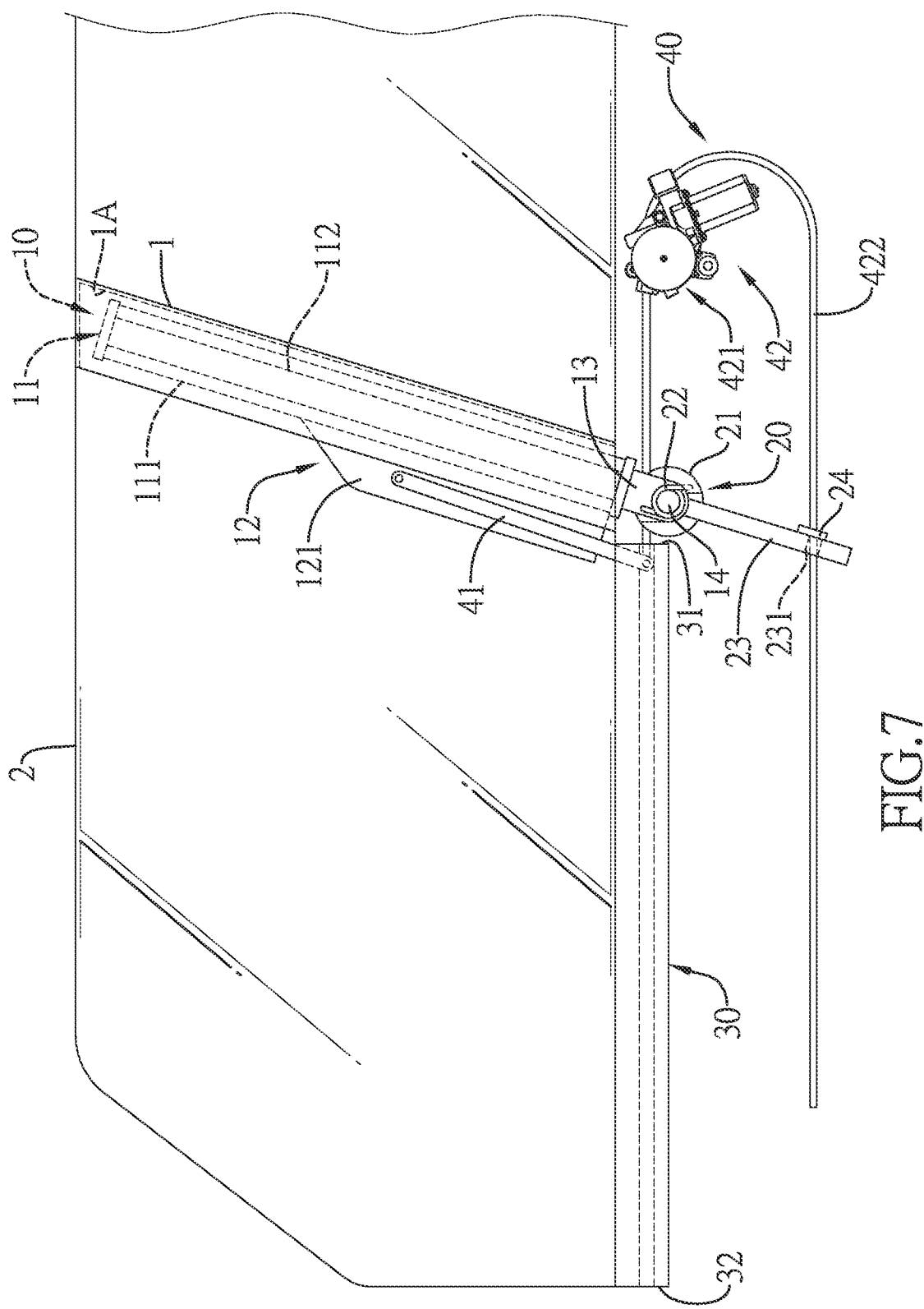
FIG. 7 is a side view of a third embodiment of a sunshade curtain in accordance with the present invention, showing the sunshade curtain is located in a folded position.
Figure 8:
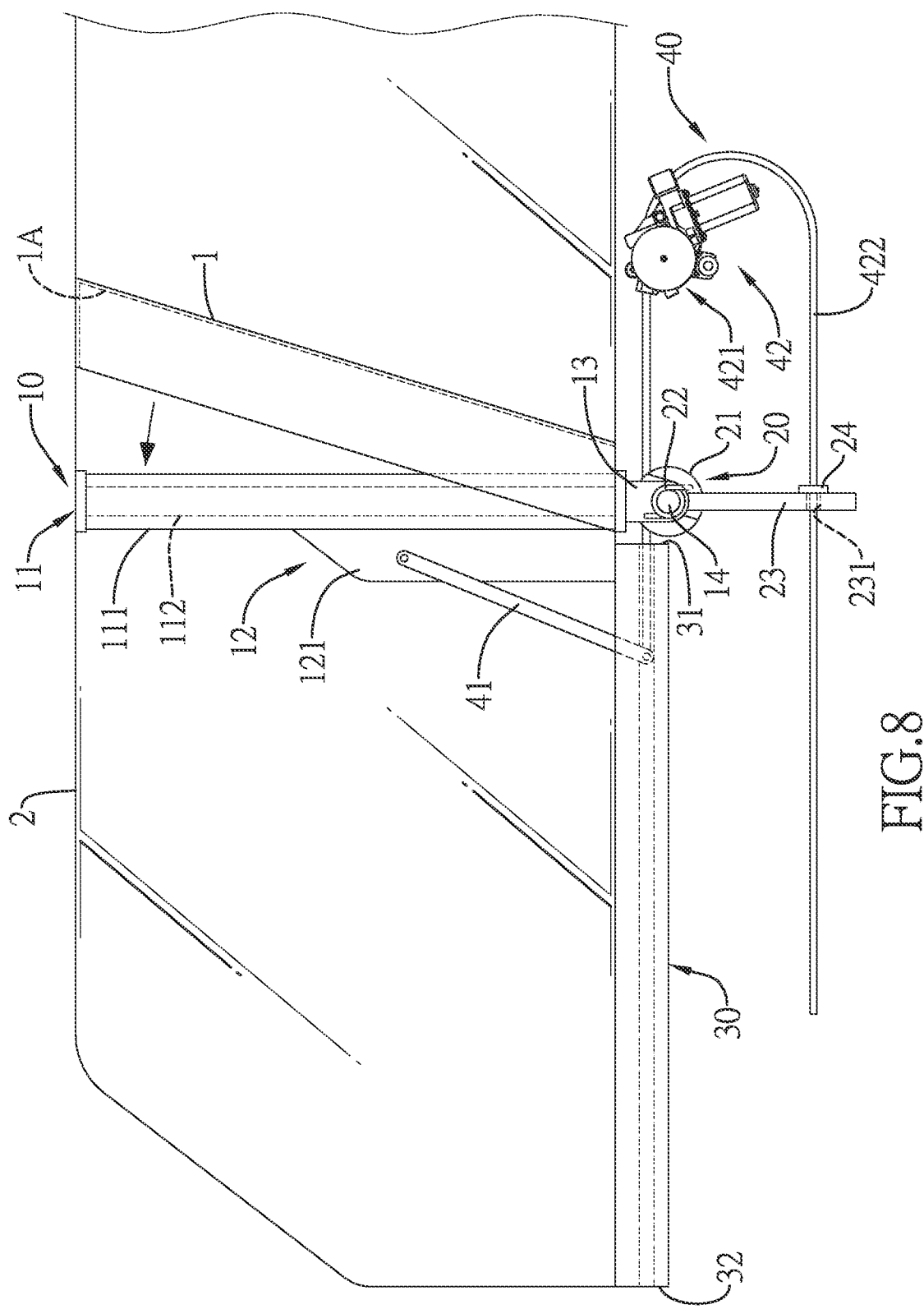
FIG. 8 is a side view of the sunshade curtain in FIG. 7, showing the sunshade curtain is located in a normal position.
Figure 9:
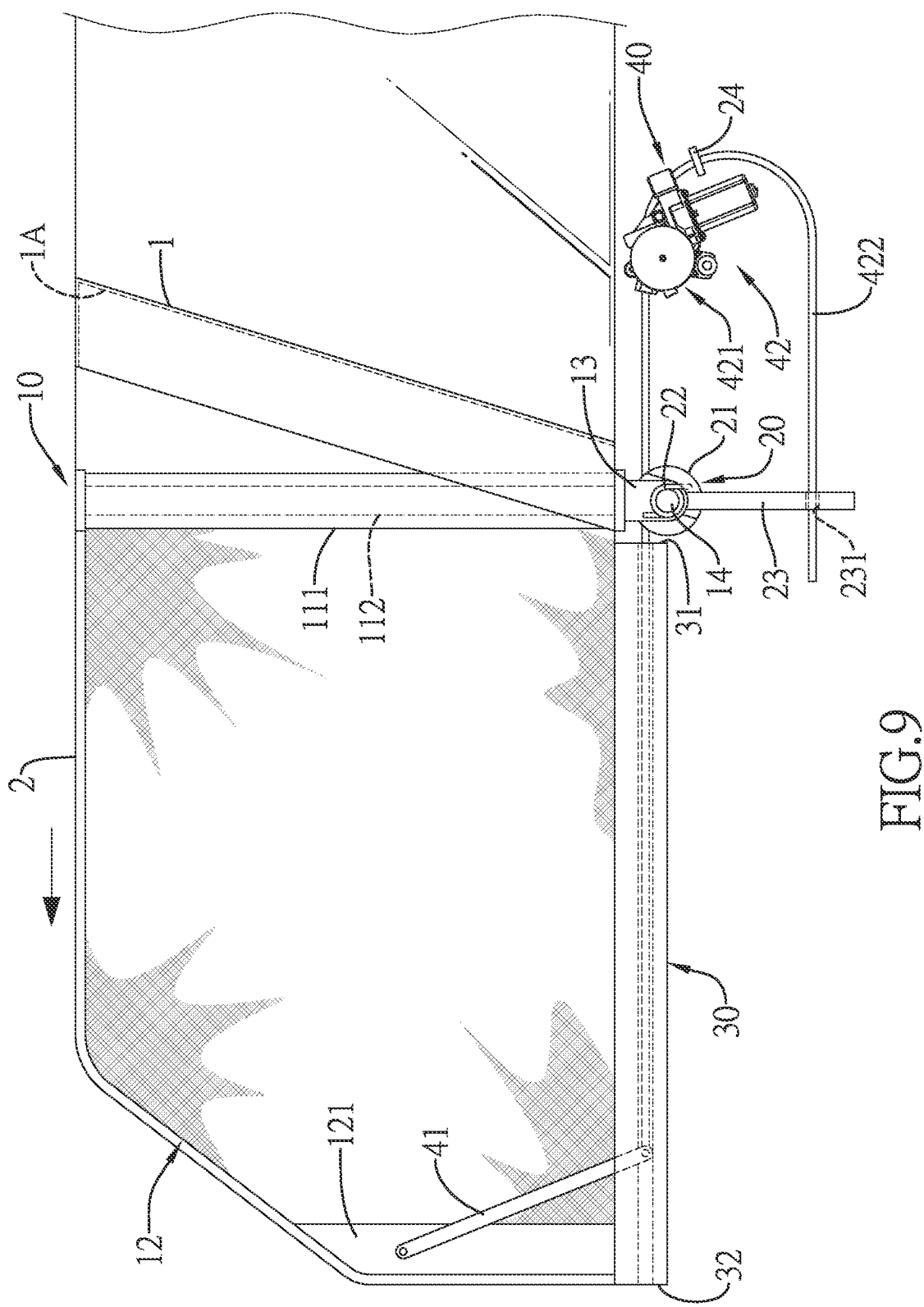
FIG. 9 is a side view of the sunshade curtain in FIG. 7, showing a curtain is in an extended state.

With reference to FIGS. 7 to 9, in the third embodiment, the end of the driving strip 422 driven by the motor gear box assembly 421 is inserted into the front end 31 of the rail 30 and is connected to the bottom end of the driving arm 41. The translocation mechanism 20 has the limiting portion 21, a linkage portion 23, and a resetting member 24. The limiting portion 21 is mounted on the vehicle side wall and is located at the side edge of the connecting portion 13 for limiting the angle range of the frontward deflection and the rearward deflection of the retracting shaft tube 11. The linkage portion 23 is mounted on the connecting portion 13, extends downwardly, and has a through hole 231 formed through a bottom section of the linkage portion 23. An end distal from the driving arm 41 of the driving strip 422 passes through the through hole 231 of the linkage portion 23. The resetting member 24 is mounted on the driving strip 422 between the front end 31 of the rail 30 and the linkage portion 23. The resetting member 24 pushes the linkage portion 23, which is connected to the retracting shaft tube 11, for frontward deflecting the retracting shaft tube 11 to restore.

With reference to FIGS. 7 to 9, the translocation mechanism 20 further has the elastic member 22. The elastic member 22 is the torsion spring or the compression spring and is mounted between the connecting portion 13 and the limiting portion 21. The elastic member 22 provides the connecting portion 13 of the retracting shaft tube 11 with a rearward resilience for auxiliarily pushing the retracting shaft tube 11 to rearward deflect. Alternatively, the elastic member 22 provides the connecting portion 13 of the retracting shaft tube 11 with the frontward resilience for auxiliarily pushing the retracting shaft tube 11 to frontward deflect.

With reference to FIGS. 7 to 9, when the curtain 12 is extended, the driving strip 422 driven by the motor gear box assembly 421 exerts a rearward force on the driving arm 41. The driving arm 41 generates a rearward pulling force to the curtain 12 of the curtain mechanism 10. The retracting shaft tube 11 tilted forward is rearward deflected from the side edge of the forward side pillar 1. The connecting portion 13 of the retracting shaft tube 11 is limited by the limiting portion 21. The retracting shaft tube 11 is rearward deflected to the normal position in the vertical state and then stops deflecting. Then, the driving strip 422 driven by the motor gear box assembly 421 drives the driving arm 41 to exert a downward force on the curtain 12 of the curtain mechanism 10. The curtain 12 is pulled and extended out of the retracting shaft tube 11 and is stopped when the operating side plate 121 of the curtain 12 moves to the rear side of the rear-side window 2.

With reference to FIGS. 7 to 9, when the curtain 12 of the curtain mechanism 10 is rolled up, the driving strip 422 driven by the motor gear box assembly 421 exerts a frontward force on the driving arm 41. The driving arm 41 generates a frontward pulling force to the curtain 12 of the curtain mechanism 10. Simultaneously, the curtain 12 is automatically rolled up by the retracting shaft tube 11. The driving arm 41 moves forward to a predetermined position at the front end 31 of the rail 30. The resetting member 24 mounted on the driving strip 422 pushes the linkage portion 23 connected to the retracting shaft tube 11. The curtain mechanism 10 is frontward deflected to restore. Further, the elastic member 22 provides the resilience, and the curtain mechanism 10 is frontward deflected and restored to the normal position at the side edge of the forward side pillar 1. Further, the curtain mechanism 10 is received into the retracting space 1A of the forward side pillar 1 and is hid in the forward side pillar 1.

Figure 10:
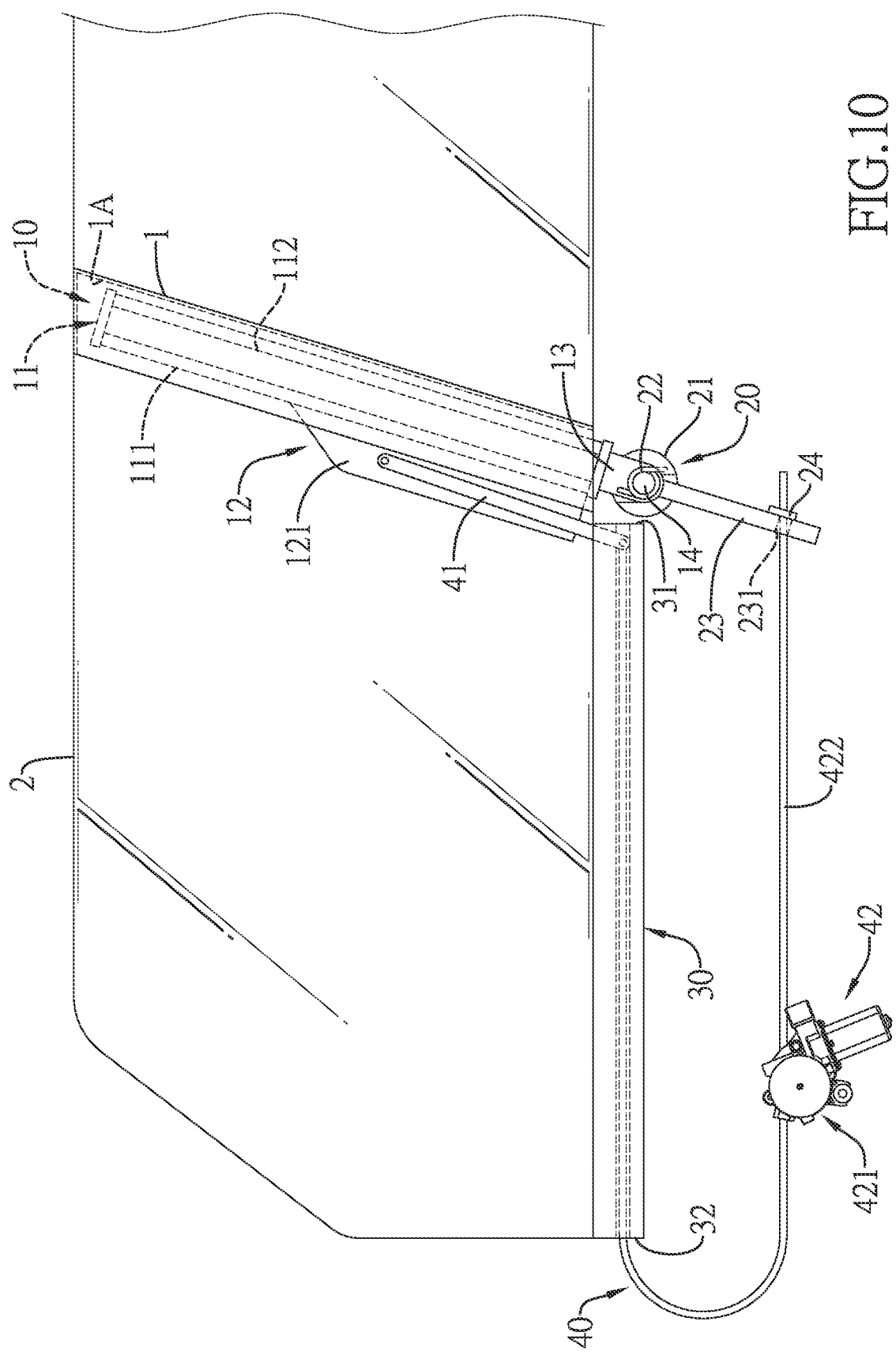
FIG. 10 is a side view of a fourth embodiment of a sunshade curtain in accordance with the present invention, showing the sunshade curtain is located in a folded position.
Figure 11:
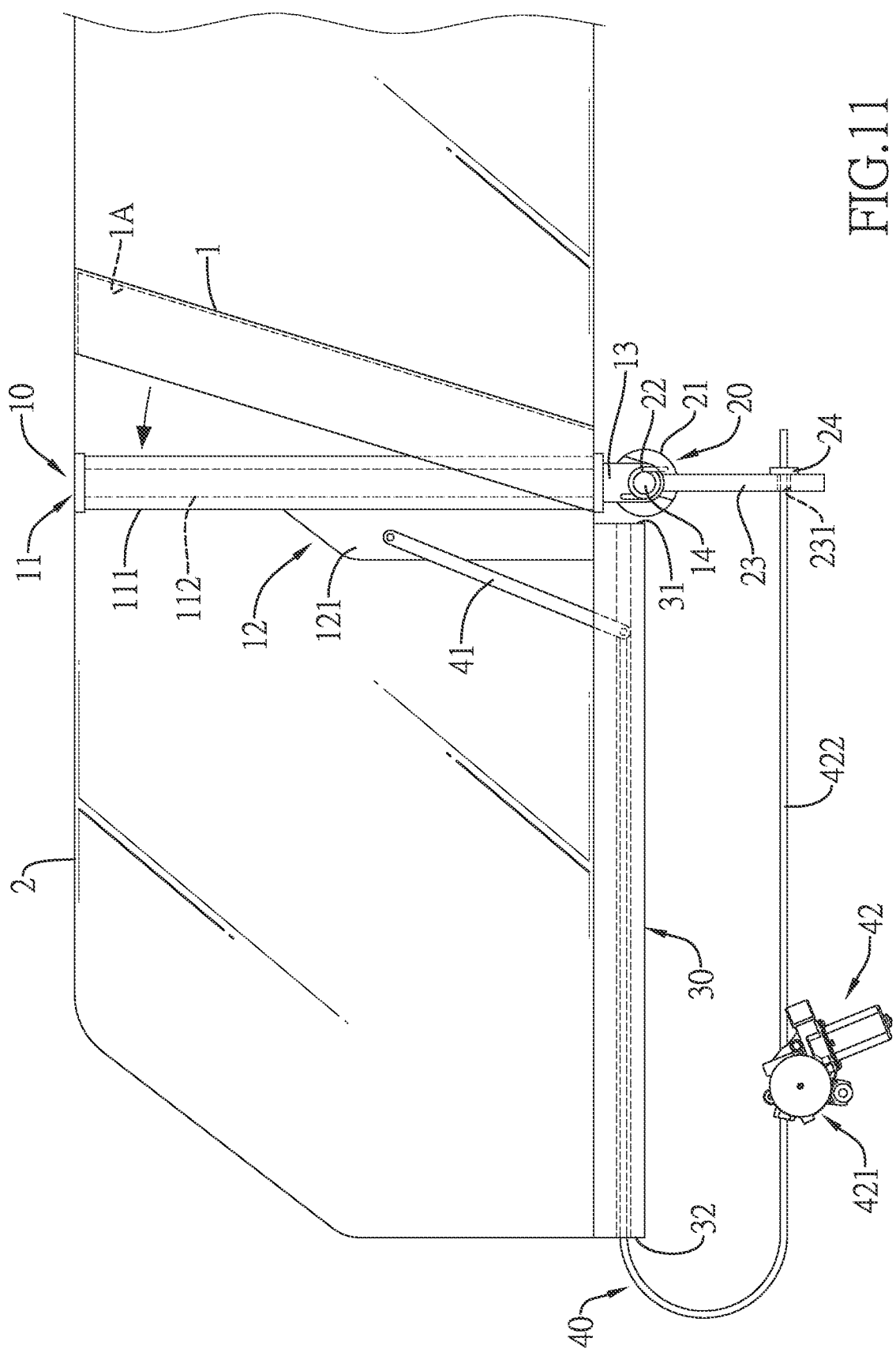
FIG. 11 is a side view of the sunshade curtain in FIG. 10, showing the sunshade curtain is located in a normal position.
Figure 12:
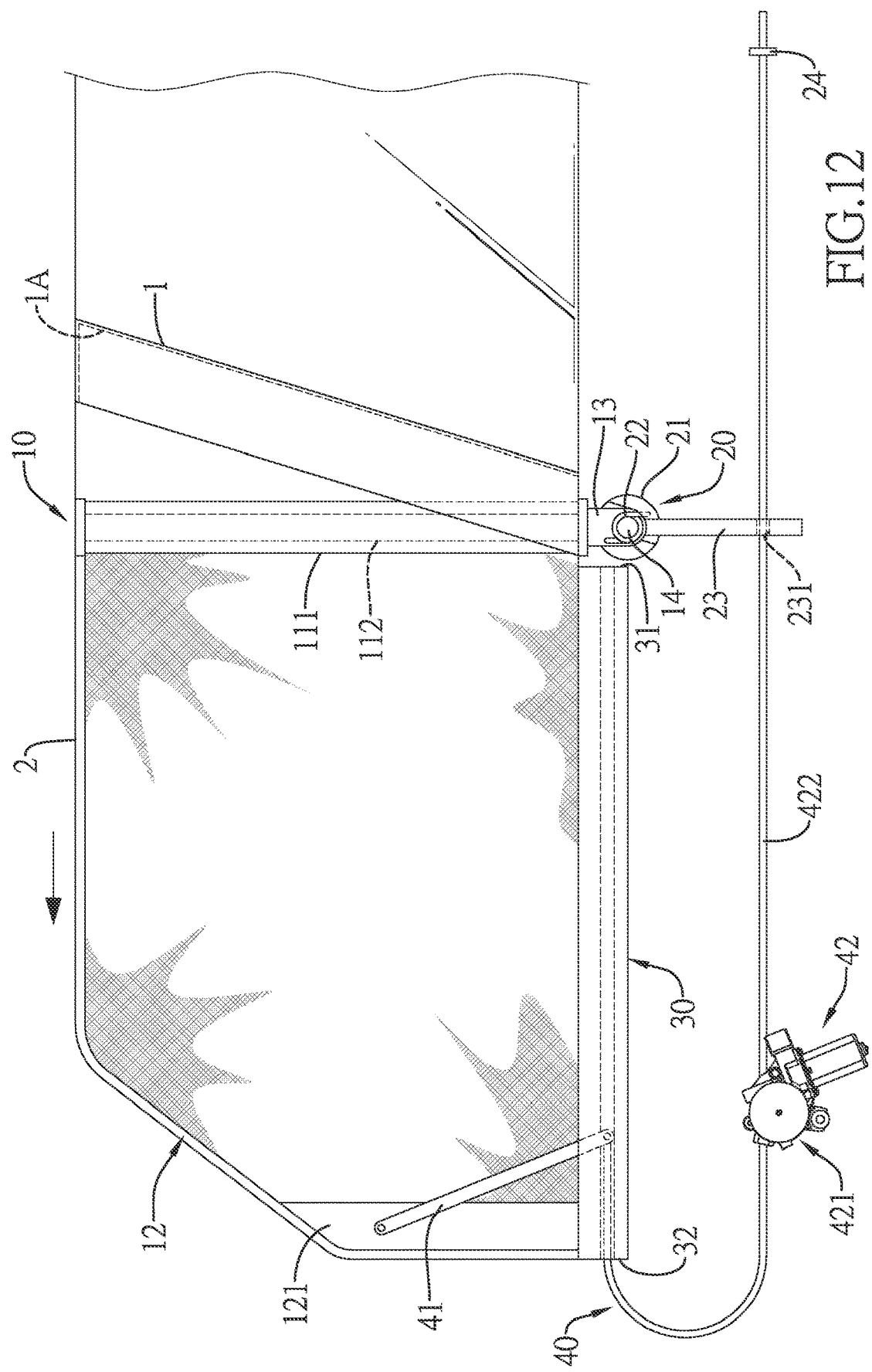
FIG. 12 is a side view of the sunshade curtain in FIG. 10, showing a curtain is in an extended state.

With reference to FIGS. 10 to 12, in a fourth embodiment, the end of the driving strip 422 passing through the motor gear box assembly 421 is inserted into the rear end 32 of the rail 30 and is connected to the bottom end of the driving arm 41. The translocation mechanism 20 has the limiting portion 21, a linkage portion 23, and a resetting member 24. The limiting portion 21 is mounted on the vehicle side wall and is located at the side edge of the connecting portion 13 of the retracting shaft tube 11 for limiting the angle range of the frontward deflection and the rearward deflection of the retracting shaft tube 11. The linkage portion 23 is mounted on the connecting portion 13, extends downwardly, and has a through hole 231 formed through the bottom section of the linkage portion 23. The end distal from the driving arm 41 of the driving strip 422 passes through the through hole 231 of the linkage portion 23. The resetting member 24 is mounted on a distal end, which passes through the linkage portion 23, of the driving strip 422. The resetting member 24 pushes the linkage portion 23 connected to the retracting shaft tube 11. The retracting shaft tube 11 is frontward deflected to restore.

With reference to FIGS. 10 to 12, the translocation mechanism 20 further has the elastic member 22. The elastic member 22 is the torsion spring or the compression spring, and is mounted between the connecting portion 13 and the limiting portion 21. The elastic member 22 provides the connecting portion 13 of the retracting shaft tube 11 with the rearward resilience for auxiliarily pushing the retracting shaft tube 11 to rearward deflect. Alternatively, the elastic member 22 provides the connecting portion 13 of the retracting shaft tube 11 with the frontward resilience for auxiliarily pushing the retracting shaft tube 11 to frontward deflect.

With reference to FIGS. 10 to 12, when the curtain 12 is extended, the driving strip 422 driven by the motor gear box assembly 421 exerts the rearward force on the driving arm 41. The driving arm 41 generates the rearward pulling force to the curtain 12 of the curtain mechanism 10. The retracting shaft tube 11 tilted forward is rearward deflected from the side edge of the forward side pillar 1. The connecting portion 13 of the retracting shaft tube 11 is limited by the limiting portion 21. The retracting shaft tube 11 is rearward deflected to the normal position in the vertical state and then stops deflecting. Then, the driving strip 422 driven by the motor gear box assembly 421 drives the driving arm 41 to exert a downward force on the curtain 12 of the curtain mechanism 10. The curtain 12 is pulled and extended out of the retracting shaft tube 11 and is stopped when the operating side plate 121 of the curtain 12 moves to the rear side of the rear-side window 2.

With reference to FIGS. 10 to 12, when the curtain 12 of the curtain mechanism 10 is rolled up, the driving strip 422 driven by the motor gear box assembly 421 exerts the frontward force on the driving arm 41. The driving arm 41 generates the frontward pulling force to the curtain 12 of the curtain mechanism 10. Simultaneously, the curtain 12 is automatically rolled up by the retracting shaft tube 11. The driving arm 41 moves forward to the predetermined position at the front end 31 of the rail 30. The resetting member 24 mounted on the driving strip 422 pushes the linkage portion 23 connected to the retracting shaft tube 11. The curtain mechanism 10 is frontward deflected to restore. Further, the elastic member 22 provides the resilience, and the curtain mechanism 10 is frontward deflected and restored to the normal position at the side edge of the forward side pillar 1. When the forward side pillar 1 has the retracting space 1A, the curtain mechanism 10 is deflected to the folded position, the curtain mechanism 10 is received into the retracting space 1A of the forward side pillar 1 and is hid in the forward side pillar 1.

Figure 13:
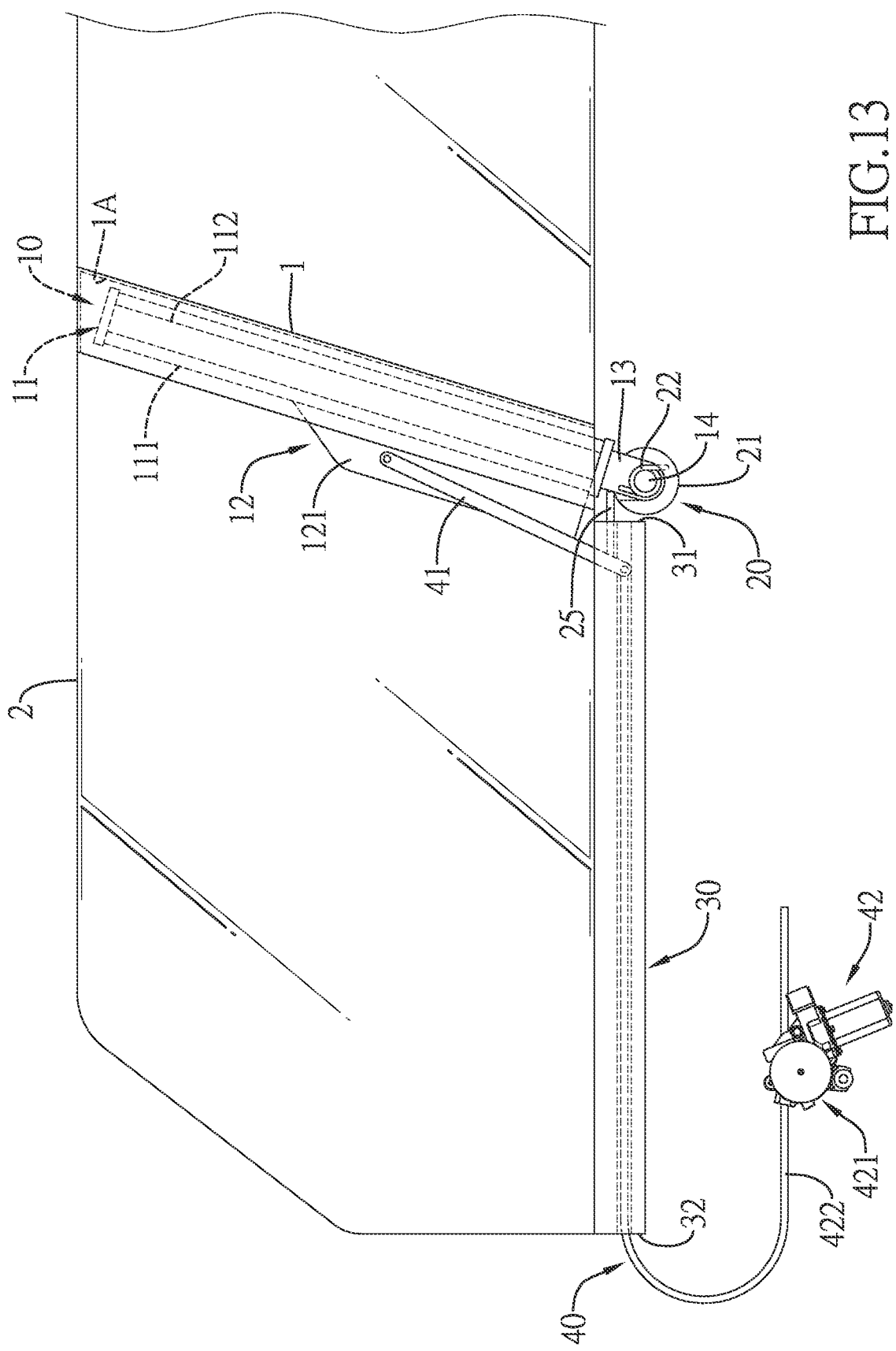
FIG. 13 is a side view of a fifth embodiment of a sunshade curtain in accordance with the present invention, showing the sunshade curtain is located in a folded position.
Figure 14:
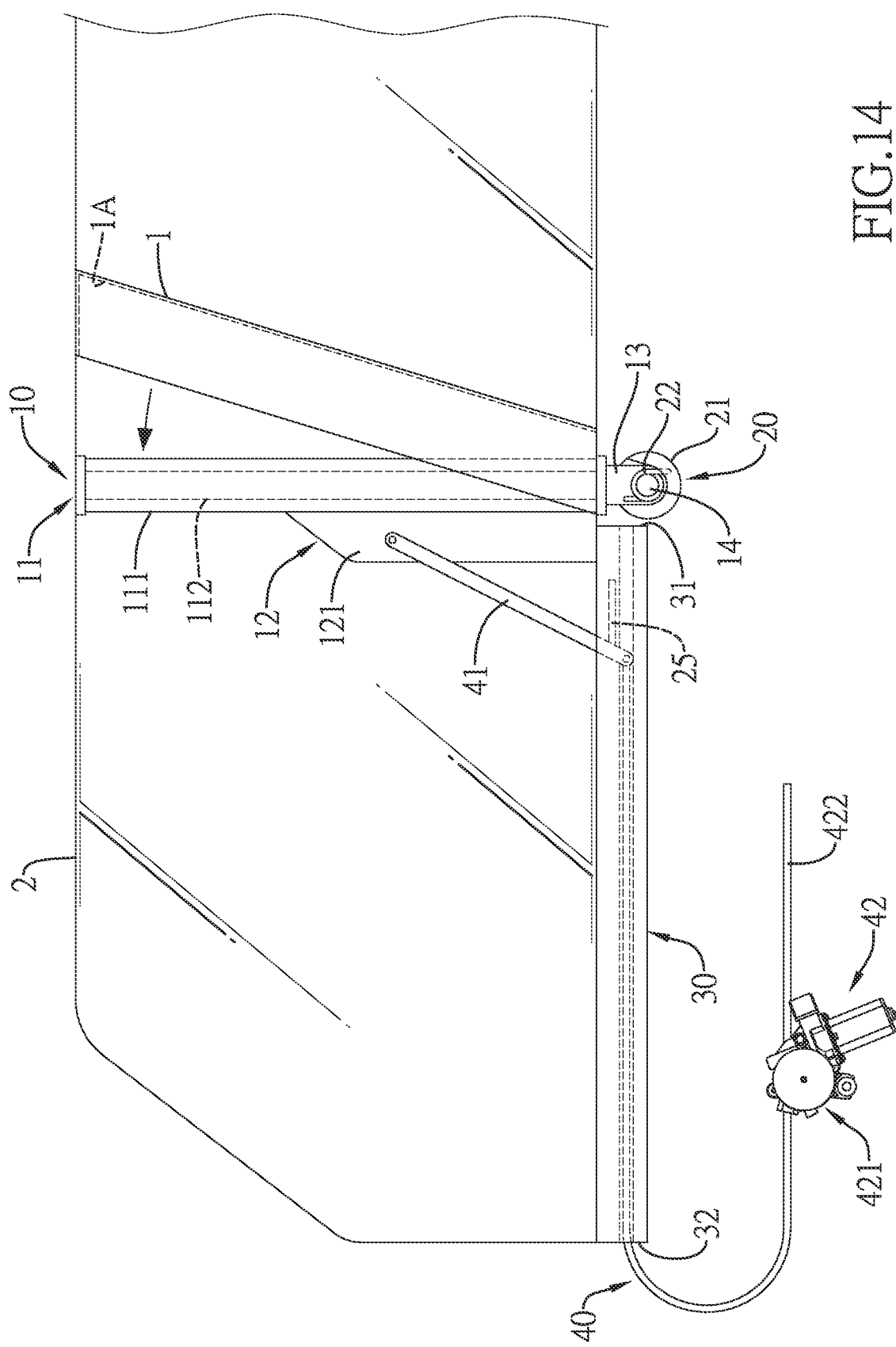
FIG. 14 is a side view of the sunshade curtain in FIG. 13, showing the sunshade curtain is located in a normal position.
Figure 15:
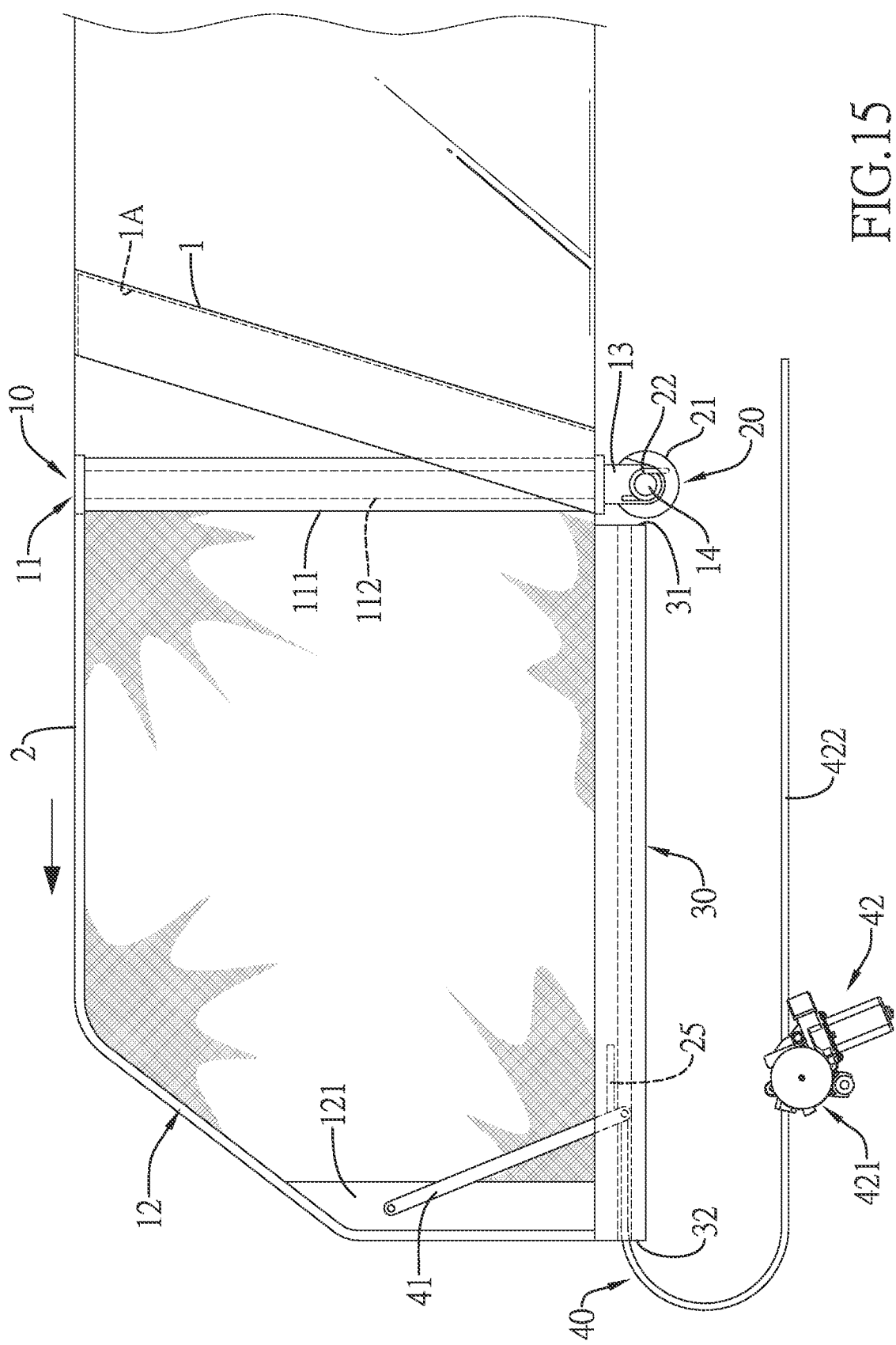
FIG. 15 is a side view of the sunshade curtain in FIG. 13, showing a curtain is in an extended state.

With reference to FIGS. 13 to 15, in a fifth embodiment, the end of the driving strip 422 passing through the motor gear box assembly 421 is inserted into the rear end 32 of the rail 30 and is connected to the bottom end of the driving arm 41. The translocation mechanism 20 has the limiting portion 21 and a push rod 25. The limiting portion 21 is mounted on the vehicle side wall and located at the side edge of the connecting portion 13 of the retracting shaft tube 11 for limiting the angle range of the frontward deflection and the rearward deflection of the retracting shaft tube 11. The retracting shaft tube 11 is rearward deflected from the side edge of the forward side pillar 1 to the normal position in the vertical state through the force driving the curtain 12 to extend backward though the driving arm 41 driven by the electric driving assembly 42. The push rod 25 is mounted on the bottom end of the driving arm 41 and extends frontward. When the driving arm 41 moves to the front end 31 of the rail 30, the push rod 25 pushes the retracting shaft tube 11 to frontward deflect to the normal position at the side edge of the forward side pillar 1.

With reference to FIGS. 13 to 15, the translocation mechanism 20 further has the elastic member 22. The elastic member 22 is the torsion spring or the compression spring and is mounted between the connecting portion 13 and the limiting portion 21. The elastic member 22 provides the connecting portion 13 of the retracting shaft tube 11 with the rearward resilience for auxiliarily pushing the retracting shaft tube 11 to rearward deflect. Alternatively, the elastic member 22 provides the connecting portion 13 of the retracting shaft tube 11 with the frontward resilience for auxiliarily pushing the retracting shaft tube 11 to deflect frontward.

With reference to FIGS. 13 to 15, when the curtain 12 is extended, the driving strip 422 driven by the motor gear box assembly 421 exerts the rearward force on the driving arm 41. The driving arm 41 generates the rearward pulling force to the curtain 12 of the curtain mechanism 10. The retracting shaft tube 11 tilted forward is rearward deflected from the side edge of the forward side pillar 1. The connecting portion 13 of the retracting shaft tube 11 is limited by the limiting portion 21. The retracting shaft tube 11 is rearward deflected to the normal position in the vertical state and then stops deflecting. Then, the driving strip 422 driven by the motor gear box assembly 421 drives the driving arm 41 to exert the downward force on the curtain 12 of the curtain mechanism 10. The curtain 12 is pulled and extended out the retracting shaft tube 11 and is stopped when the operating side plate 121 of the curtain 12 moves to the rear side of the rear-side window 2.

With reference to FIGS. 13 to 15, the curtain 12 of the curtain mechanism 10 is rolled up, and the driving strip 422 driven by the motor gear box assembly 421 exerts the frontward force on the driving arm 41. The driving arm 41 generates the frontward pulling force to the curtain 12 of the curtain mechanism 10. Simultaneously, the curtain 12 is automatically rolled up by the retracting shaft tube 11. The driving arm 41 moves forward to the predetermined position at the front end 31 of the rail 30. The push rod 25 mounted on the bottom end of the driving arm 41 pushes the retracting shaft tube 11 and the curtain mechanism 10 is frontward deflected to the folded position. When the forward side pillar 1 has the retracting space 1A, the curtain mechanism 10 is translocated to the folded position, received into the retracting space 1A of the forward side pillar 1, and hid in the forward side pillar 1.

In the aforementioned descriptions of the multiple embodiments, by a whole structure of the sunshade curtain, the sunshade curtain provides the rear-side window with a shading effect in the vehicle side wall of the vehicle. In addition, when the sunshade curtain is in the folded state, the curtain mechanism 10 is frontward deflected adjacent to a position, which is located at an inner surface of the forward side pillar 1 located in front of the rear-side window, of the vehicle side wall. The translocated curtain mechanism 10 is close to or is hid in the forward side pillar 1 for maintaining integrity and aesthetics of an interior of the vehicle. In addition, when the curtain 12 is extended, the curtain mechanism 10 is rearward translocated from a front-tilted state to the vertical state, and then the curtain 12 is pulled to extend. A bottom edge of the extended curtain 12 is close to a bottom edge of the rear-side window to flush shade the rear-side window for providing the greater shading rate for the rear-side window.

A bottom edge of the extended curtain is close to a bottom edge of the rear-side window to flush shade the rear-side window for providing a greater shading rate for the rear-side windows and providing a best shading effect.

What is claimed is:

1. A sunshade curtain having a translocation function applied to be mounted on a vehicle side wall of a vehicle for shading an inner side of a rear-side window located behind a forward side pillar of the vehicle side wall, and the sunshade curtain comprising:
  a curtain mechanism having a retracting shaft tube and a curtain;
    the curtain mounted in the retracting shaft tube and having an operating side plate extended out of the retracting shaft tube, wherein the curtain is capable of being operated to extend out or roll up; and
    the retracting shaft tube having
      a connecting portion mounted on a bottom end of the retracting shaft tube; and
      a rotating shaft mounted on the connecting portion, wherein the retracting shaft tube is pivoted below the rear-side window adjacent to the forward side pillar via the rotating shaft, such that the retracting shaft tube is capable of being rotated frontward and rearward, wherein the curtain is capable of being pulled to extend out from the rotating shaft for shading the rear-side window; and
  a translocation mechanism mounted between the retracting shaft tube and the vehicle side wall, wherein when the curtain mechanism is folded, the translocation mechanism makes the retracting shaft tube located in a folded position in a front-tilted state, and the folded position is adjacent to a side edge of the forward side pillar, wherein when the curtain mechanism is unfolded, the retracting shaft tube is capable of being operated to be deflected toward a back of the forward side pillar to a normal position in a vertical state.

2. The sunshade curtain as claimed in claim 1, wherein the curtain of the curtain mechanism is capable of being manually operated to extend out or roll up;
the curtain has a handle mounted on the operating side plate;
the curtain mechanism has a hanging member mounted at a rear side of the rear-side window; when the curtain is unfolded, the operating side plate is connected to the hanging member to be positioned; and
the translocation mechanism has
  a limiting portion mounted on the vehicle side wall and located at a side edge of the connecting portion for limiting an angle range of a frontward deflection and a rearward deflection of the retracting shaft tube; and
  an elastic member providing a resilience to the retracting shaft tube of the curtain mechanism.

3. The sunshade curtain as claimed in claim 2, wherein the elastic member is a torsion spring or a compression spring, and is mounted between the connecting portion and the limiting portion.

4. The sunshade curtain as claimed in claim 2, wherein the elastic member is an extension spring or an elastic strip, and is connected between a top section of the retracting shaft tube and the vehicle side wall.

5. The sunshade curtain as claimed in claim 1, wherein the sunshade curtain has
  a rail applied to be mounted on the vehicle side wall, located below the rear-side window, and having a rail groove with an opening facing upward; and
  a driving mechanism having
    a driving arm having
      a bottom end mounted on the rail and being moveable along the rail; and
      a top end connected to the operating side plate of the curtain;
    an electric driving assembly applied to be mounted in the vehicle side wall, connected to the driving arm, and being capable of being operated to drive the driving arm for driving the curtain of the curtain mechanism to extend out or roll up.

6. The sunshade curtain as claimed in claim 5, wherein the electric driving assembly has a motor gear box assembly and a driving strip;
the driving strip is flexible, is connected to the motor gear box assembly, and is inserted into the rail to be connected to the bottom end of the driving arm;
the motor gear is capable of being operated to drive the driving strip to drive the driving arm to move along the rail.

7. The sunshade curtain as claimed in claim 6, wherein an end of the driving strip driven by the motor gear box assembly is inserted into and connected to the bottom end of the driving arm from one of a front end and a rear end of the rail;
the translocation mechanism has
  a limiting portion mounted on the vehicle side wall and located at a side edge of the connecting portion for limiting an angle range of a frontward deflection and a rearward deflection of the retracting shaft tube; and
  an elastic member providing a frontward resilience to the retracting shaft tube of the curtain mechanism.

8. The sunshade curtain as claimed in claim 6, wherein an end of the driving strip driven by the motor gear box assembly is inserted into and connected to the bottom end of the driving arm from a front end of the rail; and
the translocation mechanism has
  a limiting portion mounted on the vehicle side wall and located at a side edge of the connecting portion for limiting an angle range of a frontward deflection and a rearward deflection of the retracting shaft tube;
  a linkage portion mounted on the connecting portion, extending downwardly, and having a through hole formed through a bottom section of the linkage portion, wherein an end distal from the driving arm of the driving strip passes through the through hole of the linkage portion; and
  a resetting member mounted on the driving strip between the front end of the rail and the linkage portion, and the resetting member pushing the linkage portion, which is connected to the retracting shaft tube, for frontward deflecting the retracting shaft tube to the normal position.

9. The sunshade curtain as claimed in claim 6, wherein an end of the driving strip driven by the motor gear box assembly is inserted into and connected to the bottom end of the driving arm from a rear end of the rail; and
the translocation mechanism has
  a limiting portion mounted on the vehicle side wall and located at a side edge of the connecting portion for limiting an angle range of a frontward deflection and a rearward deflection of the retracting shaft tube;

a linkage portion mounted on the connecting portion, extending downwardly, and having a through hole formed through a bottom section of the linkage portion, wherein an end distal from the driving arm of the driving strip passes through the through hole of the linkage portion; and a resetting member mounted on a distal end, which passes through the linkage portion, of the driving strip, and the resetting member pushing the linkage portion, which is connected to the retracting shaft tube, for frontward deflecting the retracting shaft tube to the normal position.

10. The sunshade curtain as claimed in claim 6, wherein an end driven by the motor gear box assembly of the driving strip is inserted into and connected to the bottom end of the driving arm from a rear end of the rail; and the translocation mechanism has a limiting portion mounted on the vehicle side wall and located at a side edge of the connecting portion for limiting an angle range of a frontward deflection and a rearward deflection of the retracting shaft tube; and a push rod mounted on the bottom end of the driving arm and extending frontward, wherein when the driving arm moves to a front end of the rail, the push rod pushes the retracting shaft tube to frontward deflect to the normal position at the side edge of the forward side pillar.

11. The sunshade curtain as claimed in claim 8, wherein the translocation mechanism has an elastic member mounted between the connecting portion and the limiting portion for providing a resilience to the connecting portion of the retracting shaft tube.

12. The sunshade curtain as claimed in claim 9, wherein the translocation mechanism has an elastic member mounted between the connecting portion and the limiting portion for providing a resilience to the connecting portion of the retracting shaft tube.

13. The sunshade curtain as claimed in claim 10, wherein the translocation mechanism has an elastic member mounted between the connecting portion and the limiting portion for providing a resilience to the connecting portion of the retracting shaft tube.

14. The sunshade curtain as claimed in claim 1, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

15. The sunshade curtain as claimed in claim 2, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

16. The sunshade curtain as claimed in claim 3, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

17. The sunshade curtain as claimed in claim 4, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

18. The sunshade curtain as claimed in claim 5, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

19. The sunshade curtain as claimed in claim 6, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

20. The sunshade curtain as claimed in claim 7, wherein the forward side pillar has a retracting space formed in the forward side pillar; the forward side pillar has two openings, the two openings are respectively formed on a rear side and a bottom end of the forward side pillar and both communicate with the retracting space; the curtain mechanism passes in and out of the retracting space of the forward side pillar through the two openings of the forward side pillar.

\* \* \* \* \*